United States Patent
Bajaj et al.

(10) Patent No.: US 10,693,775 B2
(45) Date of Patent: Jun. 23, 2020

(54) METHOD AND SYSTEM FOR PROVIDING AUTOMATIC ROUTER ASSIGNMENT IN A VIRTUAL ENVIRONMENT

(71) Applicant: Versa Networks, Inc., San Jose, CA (US)

(72) Inventors: Kapil Bajaj, Fremont, CA (US); Shiva Shenoy, Los Altos, CA (US); Apurva Mehta, Cupertino, GA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 15/812,897

(22) Filed: Nov. 14, 2017

(65) Prior Publication Data

US 2019/0149463 A1     May 16, 2019

(51) Int. Cl.
| | | |
|---|---|---|
| H04L 12/24 | (2006.01) | |
| H04L 12/66 | (2006.01) | |
| H04L 12/713 | (2013.01) | |
| H04L 12/803 | (2013.01) | |
| H04L 29/12 | (2006.01) | |

(52) U.S. Cl.
CPC ........... *H04L 45/586* (2013.01); *H04L 12/66* (2013.01); *H04L 41/0806* (2013.01); *H04L 61/103* (2013.01); *H04L 41/0668* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 9,021,459 B1* | 4/2015 | Qu | ............................ | G06F 8/65 710/33 |
| 2007/0008880 A1* | 1/2007 | Buchko | .................. | H04L 45/00 370/218 |
| 2009/0016215 A1* | 1/2009 | Nadas | ..................... | H04L 45/02 370/230 |
| 2010/0272111 A1* | 10/2010 | Kini | ....................... | H04L 45/00 370/395.53 |
| 2017/0012850 A1* | 1/2017 | Kumbhari | .............. | H04L 41/12 |

OTHER PUBLICATIONS

S. Nadas, Ed. Ericsson; Virtual Router Redundancy Protocol (VRRP) Version 3 for IPv4 and IPv6; ISSN: 2070-1721; 2010, 40 pages.

* cited by examiner

*Primary Examiner* — Ruihua Zhang
(74) *Attorney, Agent, or Firm* — Loza & Loza, LLP

(57) ABSTRACT

In an embodiment, a method for providing automatic router assignment in a virtual environment involves receiving a gratuitous ARP packet and setting a default gateway MAC address to a sender hardware address of the received gratuitous ARP packet, wherein the sender hardware address of the received gratuitous ARP packet is a MAC address of a master virtual router elected from a plurality of virtual routers, wherein a virtual router in the plurality of virtual routers is configured to elect a master virtual router by receiving at least one priority value advertised by another virtual router in the plurality of virtual routers, comparing the at least one received priority value to a priority value local to the virtual router to determine which priority value is the highest, and electing the virtual router having the highest priority value as the master virtual router.

19 Claims, 14 Drawing Sheets

METHOD AND SYSTEM FOR PROVIDING AUTOMATIC ROUTER ASSIGNMENT IN A VIRTUAL ENVIRONMENT

BACKGROUND

Modern businesses with distributed branches, such as banks or retail locations, are typically interconnected via an enterprise wide area network (WAN). The WAN can be implemented as a physical network or can be implemented in software (e.g., SD-WAN). When implemented as an SD-WAN in software, the WAN is typically implemented in a virtual environment. Due to implementation details and limitations caused by virtual environments, techniques used for managing and configuring a physical WAN may be unavailable for managing or configuring a SD-WAN.

SUMMARY

In an embodiment, a method for providing automatic router assignment in a virtual environment involves receiving a gratuitous ARP packet and setting a default gateway MAC address to a sender hardware address of the received gratuitous ARP packet, wherein the sender hardware address of the received gratuitous ARP packet is a MAC address of a master virtual router elected from a plurality of virtual routers, wherein a virtual router in the plurality of virtual routers is configured to elect a master virtual router by receiving at least one priority value advertised by another virtual router in the plurality of virtual routers, comparing the at least one received priority value to a priority value local to the virtual router to determine which priority value is the highest, and electing the virtual router having the highest priority value as the master virtual router.

In another embodiment, the method further comprises, if the virtual router is elected as the master virtual router, advertising the priority value local to the virtual router to other virtual routers in the plurality of virtual routers.

In another embodiment, the virtual router periodically receives advertised priority values from at least one other virtual router in the plurality of virtual routers and compares the received advertised priority values to the priority value local to the virtual router to at least one of confirm or update the election of the master virtual router.

In another embodiment, the method is repeated each time the master virtual router sends a gratuitous ARP packet.

In another embodiment, the master virtual router is configured to send a new gratuitous ARP packet periodically.

In another embodiment, setting a default gateway MAC address to a sender hardware address of the received gratuitous ARP packet comprises updating the MAC address of the default gateway in an ARP cache to the sender hardware address.

In another embodiment, the priority value advertised by another virtual router in the plurality of virtual routers is advertised in a control packet that further includes the MAC address of the virtual router advertising the priority value.

In another embodiment, a system for providing automatic router assignment in a virtual environment comprising a host is configured to receive a gratuitous ARP packet and set a default gateway MAC address to a sender hardware address of the received gratuitous ARP packet, wherein the sender hardware address of the received gratuitous ARP packet is a MAC address of a master virtual router elected from a plurality of virtual routers, and wherein a virtual router in the plurality of virtual routers is configured to elect a master virtual router by receiving at least one priority value advertised by another virtual router in the plurality of virtual routers, comparing the at least one received priority value to a priority value local to the virtual router to determine which priority value is the highest, and electing the virtual router having the highest priority value as the master virtual router.

In another embodiment, the virtual router is further configured to advertise the priority value local to the virtual router to other virtual routers in the plurality of virtual routers if the virtual router is elected as the master virtual router.

In another embodiment, the virtual router periodically receives advertised priority values from at least one other virtual router in the plurality of virtual routers and compares the received advertised priority values to the priority value local to the virtual router to at least one of confirm or update the election of the master virtual router.

In another embodiment, the master virtual router is configured to send a new gratuitous ARP packet periodically.

In another embodiment, a default gateway MAC address is set to a sender hardware address of the received gratuitous ARP packet by updating the MAC address of the default gateway in an ARP cache to the sender hardware address.

In another embodiment, the priority value advertised by another virtual router in the plurality of virtual routers is advertised in a control packet that further includes the MAC address of the virtual router advertising the priority value.

In another embodiment, a non-transitory computer-readable storage medium containing program instructions for providing automatic router assignment in a virtual environment is disclosed. In the embodiment, execution of the program instructions by one or more processors of a computer system causes the one or more processors to perform steps comprising receiving a gratuitous ARP packet and setting a default gateway MAC address to a sender hardware address of the received gratuitous ARP packet, wherein the sender hardware address of the received gratuitous ARP packet is a MAC address of a master virtual router elected from a plurality of virtual routers, and wherein a virtual router in the plurality of virtual routers is configured to elect a master virtual router by receiving at least one priority value advertised by another virtual router in the plurality of virtual routers, comparing the at least one received priority value to a priority value local to the virtual router to determine which priority value is the highest, and electing the virtual router having the highest priority value as the master virtual router.

In another embodiment, the steps further comprise, if the virtual router is elected as the master virtual router, advertising the priority value local to the virtual router to other virtual routers in the plurality of virtual routers.

In another embodiment, the virtual router periodically receives advertised priority values from at least one other virtual router in the plurality of virtual routers and compares the received advertised priority values to the priority value local to the virtual router to at least one of confirm or update the election of the master virtual router.

In another embodiment, the steps are repeated each time the master virtual router sends a gratuitous ARP packet.

In another embodiment, the master virtual router is configured to send a new gratuitous ARP packet periodically.

In another embodiment, setting a default gateway MAC address to a sender hardware address of the received gratuitous ARP packet comprises updating the MAC address of the default gateway in an ARP cache to the sender hardware address.

In another embodiment, the priority value advertised by another virtual router in the plurality of virtual routers is advertised in a control packet that further includes the MAC address of the virtual router advertising the priority value.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Virtual Router Redundancy Protocol

Figure 1:
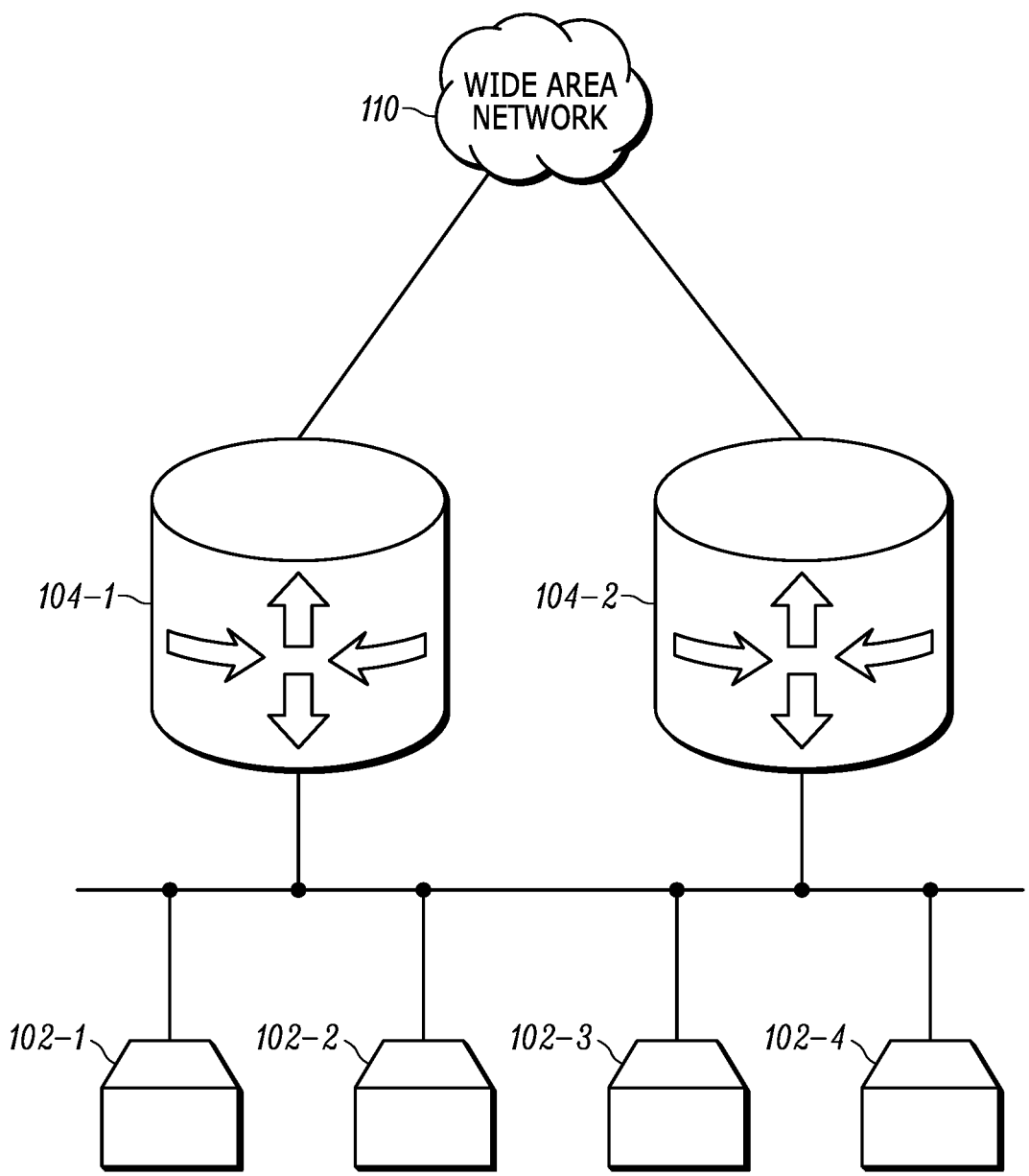
FIG. 1 is a diagram of a local network connected to a wide area network.

FIG. 1 is a diagram of a local network connected to a wide area network 110. As illustrated, the local network includes hosts 102-1-102-4 and routers 104-1, 104-2 that connect to the wide area network. Hosts in the local network are configured to access the wide area network, such as the Internet, via a network path through one of the routers (e.g. router 104-1). However, this configuration creates a single point of failure for the local network since network traffic to or from the hosts will be lost if the router fails. To avoid having a single point of failure, another router (e.g. router 104-2) on the local network can be configured as a backup router.

Ordinarily, hosts on the local network are configured to send all traffic to the media access control (MAC) address of a default gateway. For example, in FIG. 1, router 104-1 would be configured as the default gateway. If the default gateway fails or otherwise becomes unavailable, then the hosts can be reconfigured to send their traffic to the MAC address of the backup router instead. One approach to reconfiguring the hosts is to configure each host with the MAC address of the router and the backup router and then, upon detection that the router is unavailable, each host can update its address resolution protocol (ARP) table so that traffic is sent to the backup router. However, this solution requires the host to be able to determine if the router is unavailable and also requires the host to be configured with the backup router's MAC address.

In order to reduce the functionality required by hosts and to reduce the need for preconfiguring hosts, virtual router redundancy protocol (VRRP) was developed. VRRP functions, in accordance with RFC 5798 (Hinden, R., Ed., "Virtual Router Redundancy Protocol (VRRP)", RFC 3768, DOI 10.17487/RFC3768, April 2004, https://www.rfc-editor.org/info/rfc3768), as a masking protocol that allows hosts to remain agnostic as to which router traffic is being sent so that a changeover to a backup router can be made in the event of a failure without each host needing to flood the network with ARP requests to determine the MAC address of the backup router.

In accordance with VRRP, a virtual MAC (vMAC) address is created and each host is configured with the vMAC address as the MAC address of the default gateway. Routers on the local network then exchange messages via multicast to determine which router is the master router and which routers are backup routers. The master router will then respond to ARP requests with the vMAC address (rather than its own) and accept packets addressed to the vMAC address. If the master router becomes unavailable, then the backup routers can elect a new master router and the new master router will respond to ARP requests with the vMAC address (rather than its own) and accept packets addressed to the vMAC address until the original master router becomes available again. Thus, without changing the MAC address for the default gateway on each of the hosts, traffic can be re-routed through the backup router if the master router becomes unavailable.

VRRP in a Virtual Environment

In an embodiment, a virtual environment can be a software instance or instances that implements, manages, and controls virtual network components. The virtual environment can be run on general-purpose hardware, while specific network functionality can be performed by software running on the general-purpose hardware. Virtual network components may include, for example virtual routers or virtual hosts. For example, virtual routers and virtual hosts are distinguishable from their physical counter-parts (e.g., physical routers and physical host devices) in that the virtual routers and virtual hosts utilize virtual resources rather than physical resources. Typically, the virtual resources are abstractions of underlying physical hardware managed and controlled by a hypervisor running on the underlying physical hardware. For example, a host device may have a physical network interface controller (NIC). Virtual machines running in a hypervisor on the host device will each have their own virtual NICs that are supported by the physical NIC of the host device and managed by the hypervisor running on the host device. Accordingly, the functionality of a virtual router or virtual host will be similar to the functionality of a physical router or a physical host. A fundamental difference between physical routers and hosts and virtual routers and hosts lies in the makeup (e.g., physical or virtual) of the resources supporting the routers and hosts.

Figure 2:
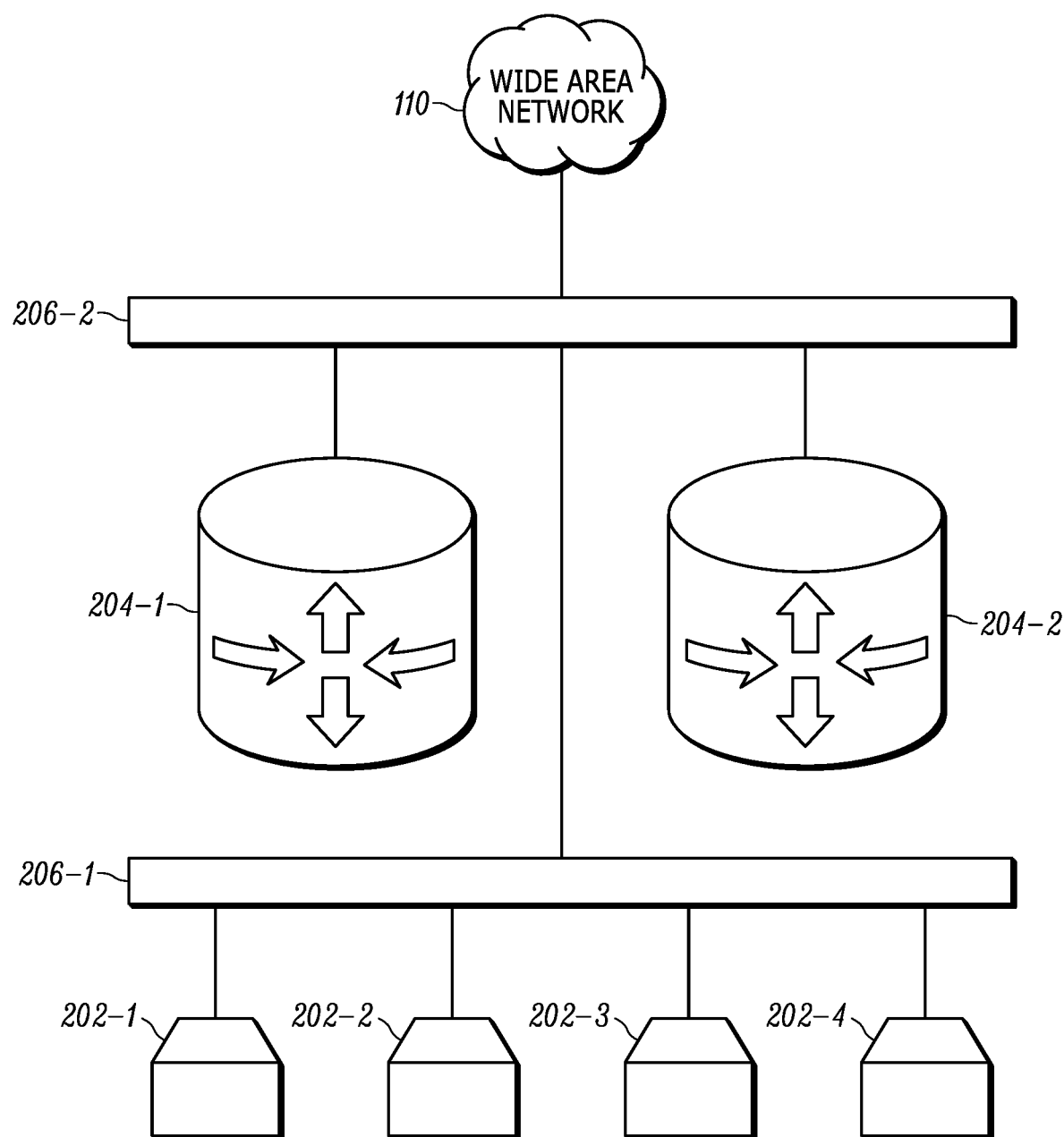
FIG. 2 is a diagram of a local virtual network.

While VRRP can be a useful solution to provide router redundancy in a physical network, due to the virtual makeup of resources in a virtual environment, the use of VRRP may not be possible in a virtual environment. FIG. 2 is a diagram of a local virtual network. The virtual network includes virtual hosts 202-1-202-4 and virtual routers 204-1, 204-2 that are instantiated on virtual machines (not shown) managed by hypervisors 206-1, 206-2. That is, hosts and routers are implemented by software running within one or more virtual machines. The hosts and the virtual routers can be managed by the same hypervisor or, as illustrated in FIG. 2, multiple hypervisors can be used (e.g., one to manage the virtual routers and one to manage the hosts).

As described above, VRRP makes use of a vMAC address that is assumed by whichever router is currently behaving as the master router. However, in a virtual environment, the hypervisor managing the virtual machines on which the routers are running will typically drop or not forward packets addressed to a MAC address that the hypervisor or a hypervisor management network has not assigned to one of the virtual machines the hypervisor is managing. For example, with reference to FIG. 2, if virtual router 204-1 is assigned MAC address 52:54:00:00:00:01 and virtual router 204-2 is assigned MAC address 52:54:00:00:00:02, then hypervisor 206-2 would drop any packet with a MAC address other than 52:54:00:00:00:01 and 52:54:00:00:00:02, such as a packet with the vMAC address, because the other MAC addresses are not assigned to any of the virtual machines the hypervisor is managing. Thus, traffic sent to a vMAC address will be dropped in a virtual environment if a hypervisor is configured to drop traffic addressed to any MAC address not assigned to a virtual router the hypervisor is managing.

Virtual Router Redundancy Using Modified VRRP

In accordance with an embodiment of the invention, VRRP can be modified and used in a method for providing automatic router assignment in a virtual environment. By modifying the manner in which VRRP facilitates changes of the master virtual router in accordance with an embodiment of the invention, other techniques of VRRP can remain unmodified.

In accordance with an embodiment of the invention, a method for providing automatic router assignment in a virtual environment involves receiving a gratuitous ARP packet and setting a default gateway MAC address to a sender hardware address of the received gratuitous ARP packet, wherein the sender hardware address of the received gratuitous ARP packet is a MAC address of a master virtual router elected from a plurality of virtual routers and wherein a virtual router in the plurality of virtual routers is configured to elect a master virtual router by receiving at least one priority value advertised by another virtual router in the plurality of virtual routers, comparing the at least one received priority value to a priority value local to the virtual router to determine which priority value is the highest, and electing the virtual router having the highest priority value as the master virtual router.

Accordingly, in operation, virtual routers can elect a master virtual router by comparing priority values. If a changeover to another router is needed (e.g., due to equipment failure or system upgrades), the virtual routers can elect a different router as the master virtual router by repeating the election process (e.g., the comparison of priority values) to elect a new master virtual router. Once elected, hosts can be configured to send traffic to the newly elected master router by using the sender hardware address of gratuitous ARP packets sent by the elected master router. A gratuitous ARP packet can be either a gratuitous ARP request message or a gratuitous ARP reply message. Gratuitous ARP packets are part of the ARP protocol and can be used to announce a sender's address (e.g., the sender's MAC address) to expedite the update of hosts' ARP caches.

Thus, by using gratuitous ARP packets that include the MAC address of the master virtual router and electing the master virtual router (e.g., electing a different virtual router to be the master virtual router) to affect a changeover, the effect of VRRP (i.e., automatic router redundancy) can be achieved in a virtual environment because necessary messages and packets will not be blocked or dropped by a hypervisor.

For example, referring again to FIG. 2 in which the virtual network includes virtual hosts and virtual routers instantiated on virtual machines managed by hypervisors, the hosts are configured with a default gateway. The ARP cache at each host includes a MAC address for the default gateway, which is the MAC address of the master virtual router. Periodically, the hosts receive gratuitous ARP packets from the virtual router currently elected as the master virtual router, as described below, and update their ARP caches. Thus, if the master virtual router changes, the ARP caches of the hosts will be updated by subsequent gratuitous ARP packets without manual re-configuration and without the hosts having to flood the network with ARP requests.

In an embodiment, the hosts update their ARP caches by setting the MAC address of the default gateway to the sender hardware address of the received gratuitous ARP packet. Thus, if a new master virtual router is elected and the gratuitous ARP packet is sent from the new master virtual router, then the sender hardware address of the gratuitous ARP packet will change to the MAC address of the new master router and the MAC address of the default gateway in the ARP caches of the hosts will be updated to the MAC address of the new master router.

Figure 3A:
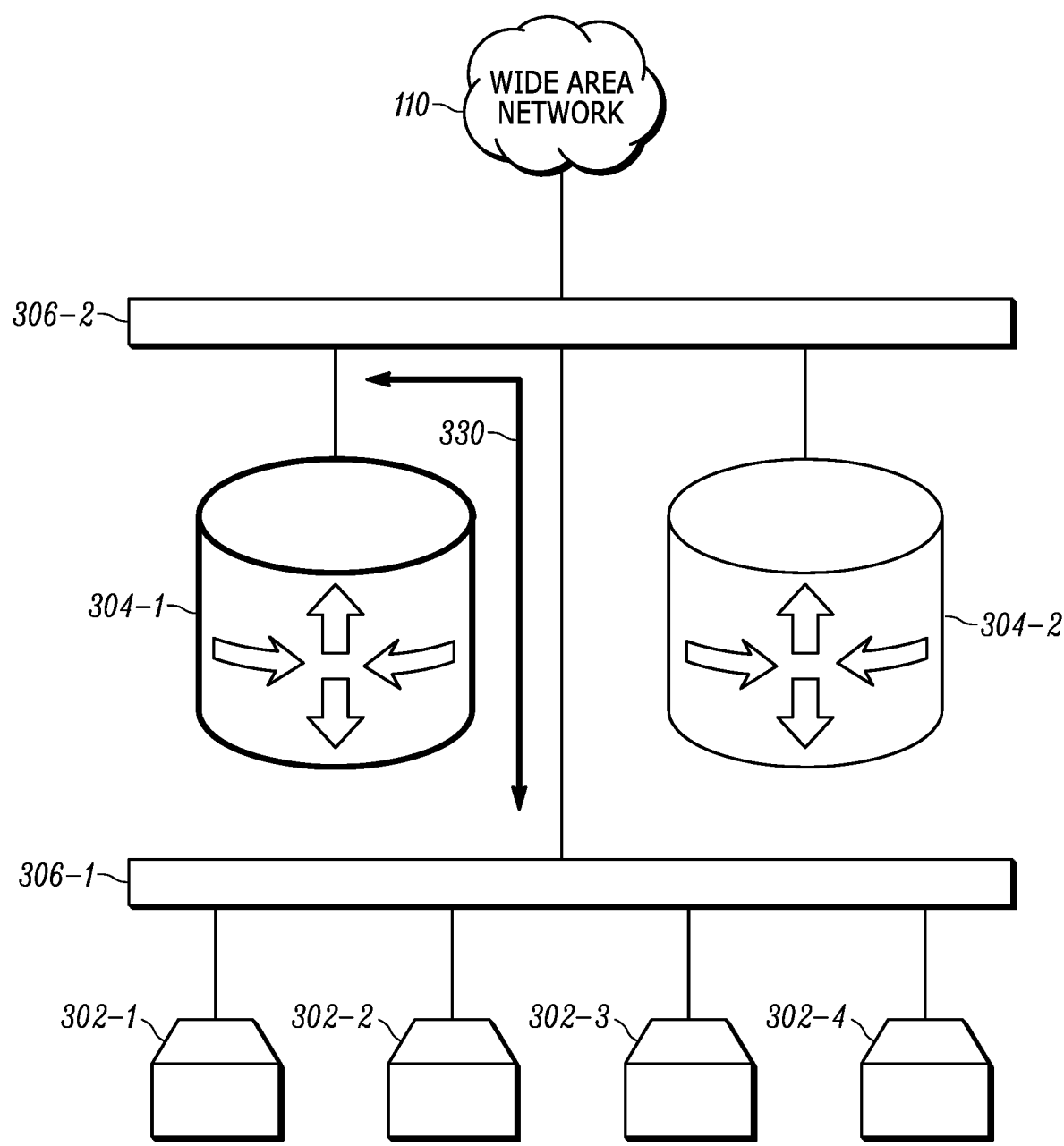
FIGS. 3A-3E illustrate a technique for providing automatic router assignment in a virtual environment in accordance with an embodiment of the invention.

FIGS. 3A-3E illustrate a technique for providing automatic router assignment in a virtual environment in accordance with an embodiment of the invention. With reference to FIG. 3A, the virtual network is similar to the virtual network of FIG. 2A. The virtual network includes two virtual routers 304-1, 304-2 managed by a first hypervisor 306-2 and four hosts 302-1-302-4 managed by a second hypervisor 306-1. Virtual router 304-1 is initially configured as the master virtual router, while virtual router 304-2 is initially configured as a backup virtual router. Thus, virtual router 304-2, as a backup virtual router, is not configured to send any traffic to the hosts, while virtual router 304-1, as the master virtual router, is configured to periodically send gratuitous ARP packets to the hosts. For example, virtual router 304-1 can be configured to send a gratuitous ARP packet once every ten seconds or at a greater frequency on another regular interval. Accordingly, the ARP caches of the host are configured with the MAC address of virtual router 304-1 and all traffic is directed to virtual router 304-1, as indicated by the arrow 330.

Concurrent with sending gratuitous ARP packets, virtual router 304-1, as the master router, can be further configured to periodically advertise its priority value to virtual router 304-2 and virtual router 304-2 can be configured to compare its priority value to the received priority value. As defined by VRRP, the master router periodically advertises its priority value in association with the vMAC address. Accordingly, to avoid the advertisements from being dropped by the hypervisors, the advertisements can be modified to advertise priority values in association with the MAC address of the router sending the advertisements, in accordance with an embodiment of the invention. In the example of FIG. 3A, virtual router 304-1 has a higher priority value than virtual router 304-2. Accordingly, virtual router 304-2 will remain as the backup virtual router. Thus, while virtual router 304-1 and virtual router 304-2 both remain online, virtual router 304-1 will advertise its higher priority value and remain the master virtual router.

Figure 3B:
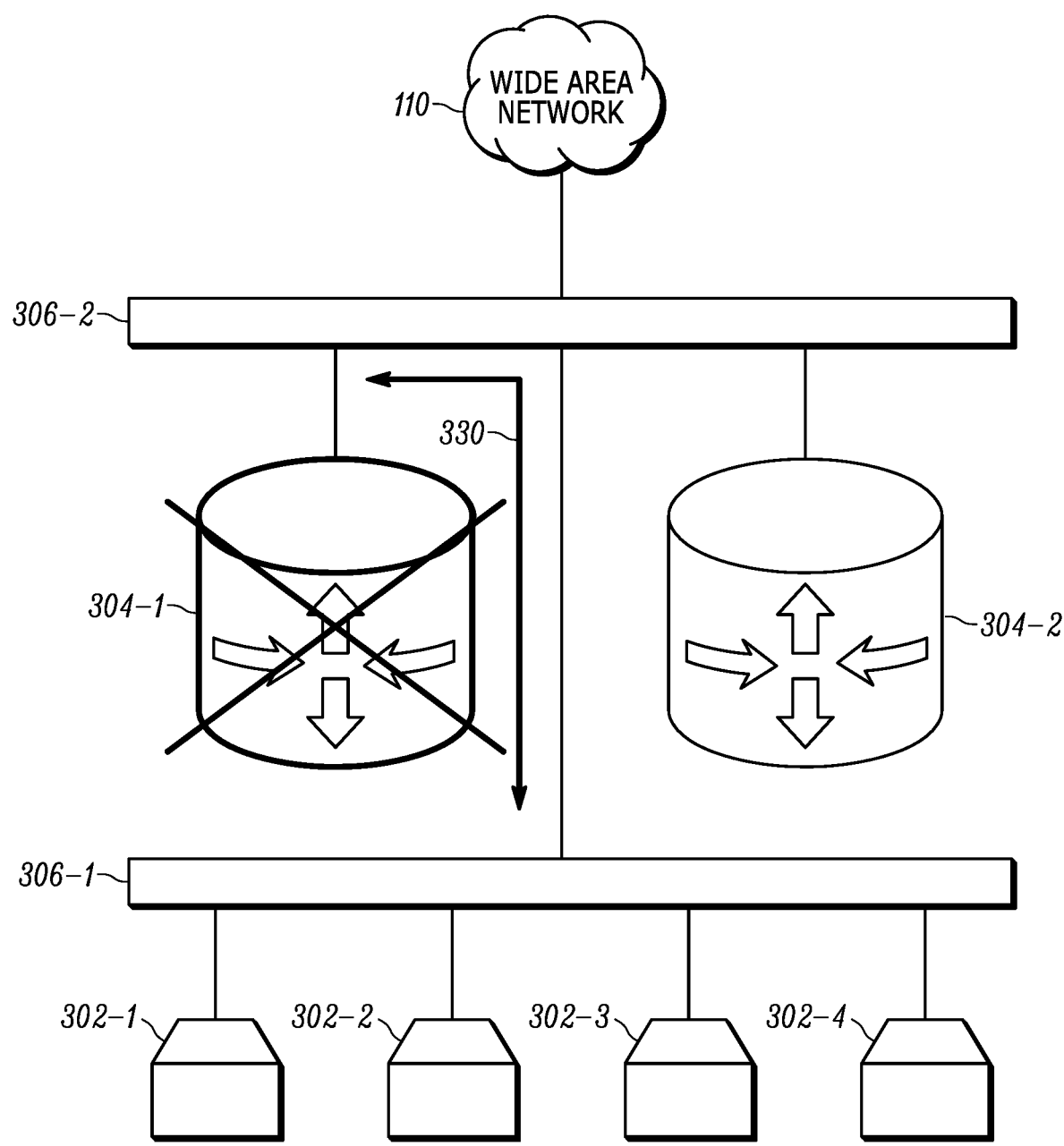

With reference to FIG. 3B, virtual router 304-1 becomes unavailable. Accordingly, virtual router 304-2 no longer receives priority values from virtual router 304-1 and now has the highest (and only) priority value. Thus, virtual router 304-2 determines that it is the master virtual router.

Figure 3C:
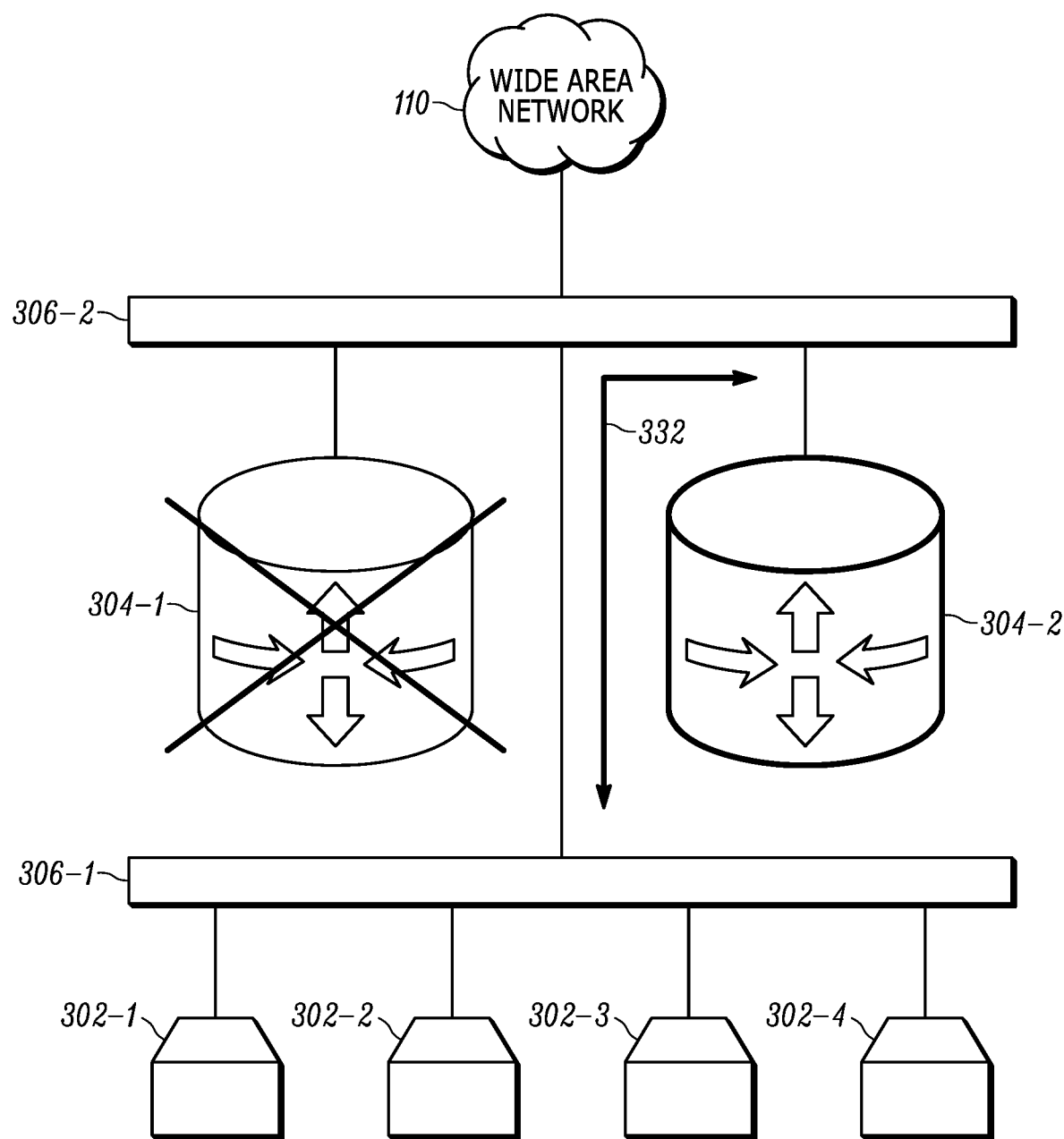

With reference to FIG. 3C, virtual router 304-2, as the master virtual router, begins advertising its priority value (associated with its MAC address) and sending gratuitous ARP packets to hosts. Then, upon receipt of the gratuitous ARP packets, ARP caches of the hosts can be re-configured with the MAC address of virtual router 304-2, as described above, and all traffic can be directed to virtual router 304-2, as indicated by the arrow 332.

Concurrent with sending gratuitous ARP packets and advertising its priority value, virtual router 304-2 continues to compare its priority value with any received priority values. While virtual router 304-1 remains offline, virtual router 304-2 will receive no other priority values with which to compare and will remain the master virtual router.

Figure 3D:
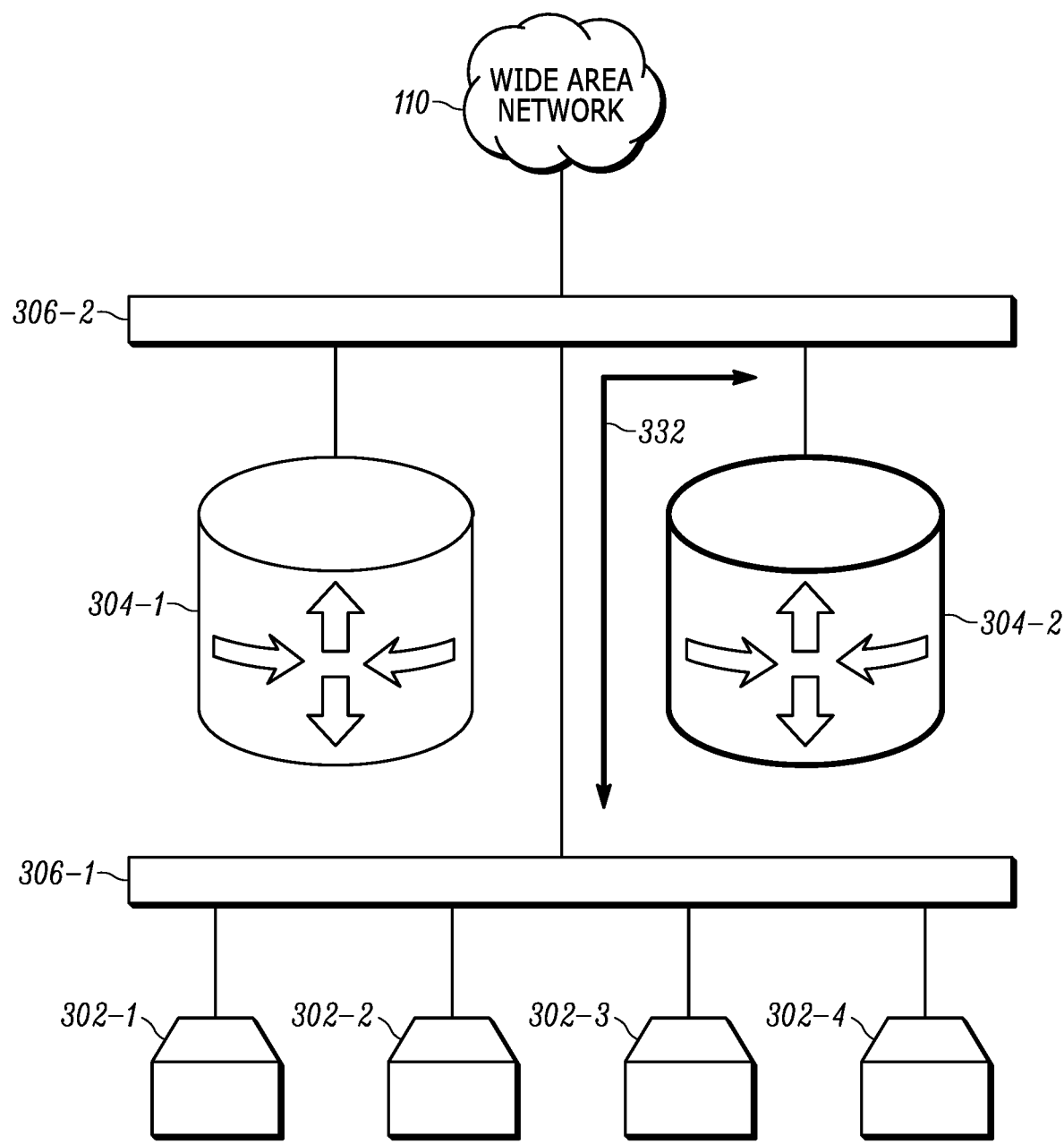

With reference to FIG. 3D, virtual router 304-1 has come back online. Virtual router 304-1 begins advertising its priority value again and, upon receipt and comparison to the priority value of virtual router 304-2, virtual router 304-1 will determine that it is the master router. Accordingly, virtual router 304-1 will begin sending gratuitous ARP packets to the hosts and advertising its priority value. Virtual router 304-2 will receive the advertised priority value, compare its priority value with the priority value advertised by virtual router 304-1, and determine that it is no longer the master router. Virtual router 304-2 will then return to being a backup virtual router.

Figure 3E:
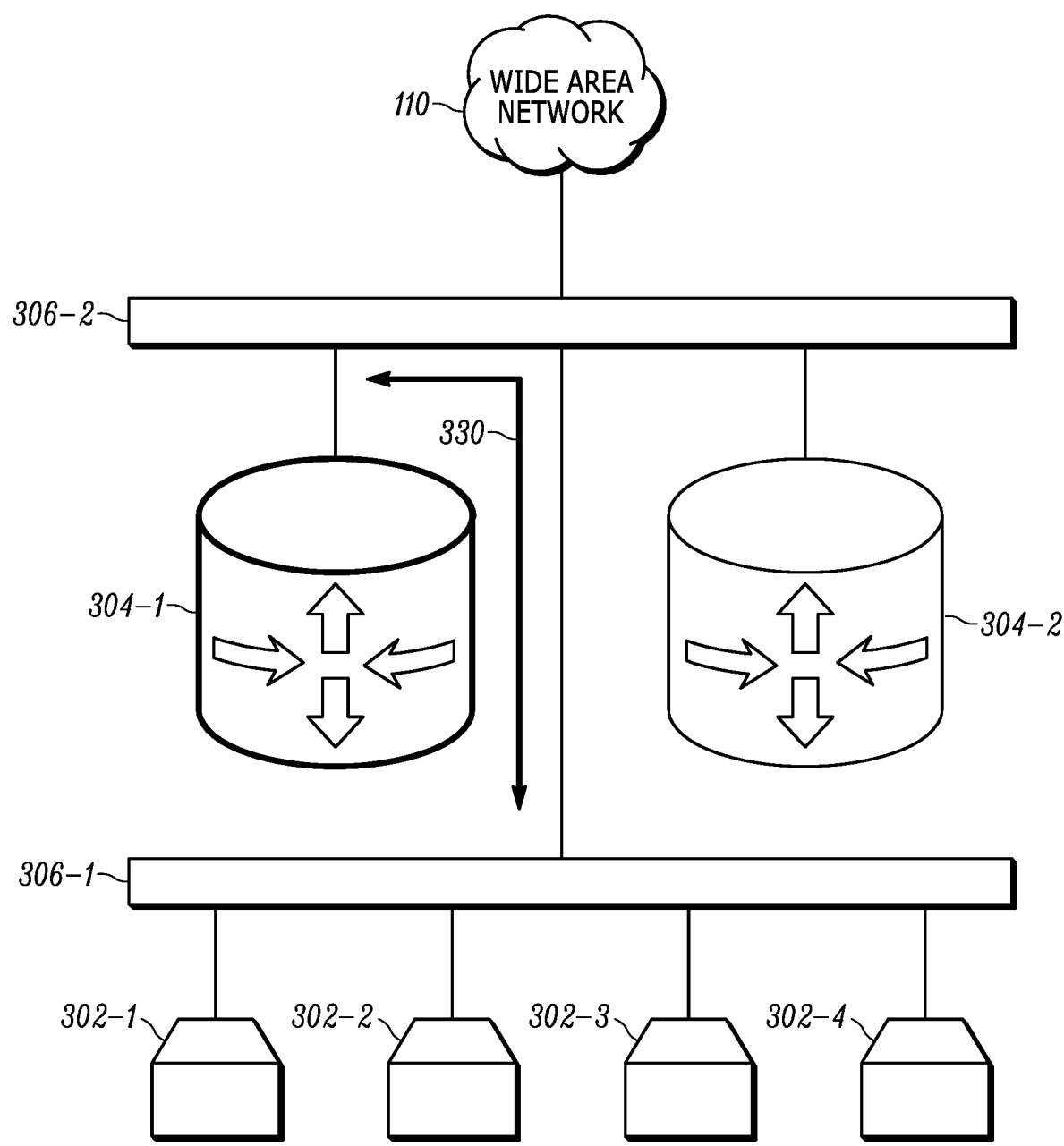

With reference to FIG. 3E, in response to receiving the gratuitous ARP packets from virtual router 304-1, the ARP caches of the hosts are re-configured with the MAC address of virtual router 304-1 and all traffic is directed back to virtual router 304-1, as indicated by the arrow 330.

Thus, by employing the above-described technique, traffic from the hosts can be automatically routed to the backup virtual router when the master virtual router becomes unavailable and automatically restored when the master virtual router again becomes available without manual reconfiguration of hosts and without the hosts having to flood the network with ARP requests. Accordingly, the benefit of router redundancy offered by VRRP in a physical network can be enjoyed in a virtual environment.

Virtual Router Election

As described above, virtual routers in a plurality of virtual routers are configured to elect a master virtual router. In an embodiment, techniques for electing a virtual router according to VRRP can be modified to implement election in a virtual environment.

Similar to VRRP, the virtual routers are defined with three states: initialize, backup, or master. In the initialize state, the virtual router waits for a startup event and then, if the priority value local to the virtual router is equal to 255, the virtual router transitions to the master state. If the priority local to the virtual router is not equal to 255 after the startup event, then the virtual router transitions to the backup state. In the backup state, the virtual router periodically (e.g., on an interval) receives priority values advertised by the master virtual router via control packets that include the priority value of the master virtual router and the MAC address of the master virtual router (e.g., not the vMAC address, as defined by VRRP). In the backup state, the virtual router determines if the advertised priority value is greater than its own priority value (e.g., the priority value local to the virtual router). If the priority value advertised in a control packet is greater than the priority value of the virtual router, then the virtual router updates the MAC address of the master virtual router in its ARP cache with the MAC address in the control packet and remains in the backup state. Alternatively, if the priority value advertised in the control packet is not greater than the priority value of the virtual router, then the virtual router updates the MAC address of the master virtual router in its ARP cache with its own MAC address and transitions to the master state. Additionally, if no advertisement from the master virtual router is received at least once in a given time limit or if an advertisement with a priority value of zero is received, the master virtual router is presumed to be down. When the master virtual router is presumed to be down, virtual routers in the backup state advertise their own priority value and the virtual router that advertises the highest priority value transitions to the master state, while the rest of the virtual routers remain in the backup state. In the master state, the virtual router performs router functions for associated hosts and periodically (e.g., on a five second interval) sends gratuitous ARP packets in order to advertise its priority value to other virtual routers. Additionally, if an advertisement is received, the virtual router determines if the priority value received in the advertisement is greater than its own priority value. If the received priority value is greater than its own priority value, the virtual router transitions to the backup state.

As defined by VRRP, advertisements from a master router to a backup routers are sent using multicast. However, in many virtual environments such as Amazon Web Services (AWS), multicast is not available. Accordingly, VRRP can be operated in unicast mode, which is typically available in virtual environments. Also as defined by VRRP, advertisements from the master router to backup routers use a vMAC address. In a virtual environment, the advertisements could be dropped or blocked by a hypervisor. Accordingly, the advertisements are modified to use the MAC address of the master virtual router instead of the vMAC address.

Load-Balancing Using Modified VRRP

In addition to providing redundancy to eliminate a single-point of failure in a virtual environment, the modified VRRP described above can be used to implement load balancing of network traffic in the virtual environment.

In a physical environment, the number of routers in a network tends to stay constant because the process for adding or removing routers from the network is a physical process by which a new physical router is connected to the network and provisioned. Alternatively, adding or removing virtual routers to or from a virtual network in a virtual environment can be more efficient because a virtual router can be added to a virtual network by simply instantiating another instance of a virtual router on a virtual machine in the virtual network and removed by simply powering down the virtual router instance. Because less effort is required to add and remove virtual routers in a virtual environment, the number of instantiated virtual routers can be quickly scaled up and down to balance network load in an efficient manner. However, even though adding and removing virtual routers requires less effort, hosts must still be reconfigured to route traffic to the added virtual routers or to consolidate traffic when a router is removed. The individual reconfiguration of each host when a virtual router is added or removed would increase the workload of network administrators so greatly that the task of reconfiguring hosts may become impractical.

In accordance with an embodiment of the invention, a method for automatically balancing network load in a virtual environment is disclosed. The method involves establishing a plurality of groups, assigning hosts to at least one group in the plurality of groups, assigning priority values to a first virtual router for each group in the plurality of groups, wherein the priority value for a first group is a high priority and the priority value for all other groups is a low priority, initializing an additional virtual router when network load exceeds a defined threshold, assigning a high priority value to the additional virtual router for a group in the plurality of groups, and sending a gratuitous ARP packet to hosts assigned to the group, wherein the gratuitous ARP packet is sent by the virtual router assigned the highest priority for the group, wherein each virtual router in the virtual environment determines the virtual router assigned the highest priority value for the group by receiving priority values advertised by other virtual routers in the plurality of virtual routers at a virtual router and comparing the received priority values with a priority value with a local priority value to determine which virtual router has been assigned the highest priority value for the group.

Thus, by assigning hosts to groups and then setting different priority values for each virtual router on a group-by-group basis, network load from hosts can be balanced across a plurality of virtual routers simply by bringing another virtual router online because virtual routers are configured to compare priority values and automatically send gratuitous ARP packets to hosts if reconfiguration is needed. Accordingly, individual reconfiguration of each host is not required when a virtual router is added or removed and so balancing network load becomes possible.

Figure 4A:
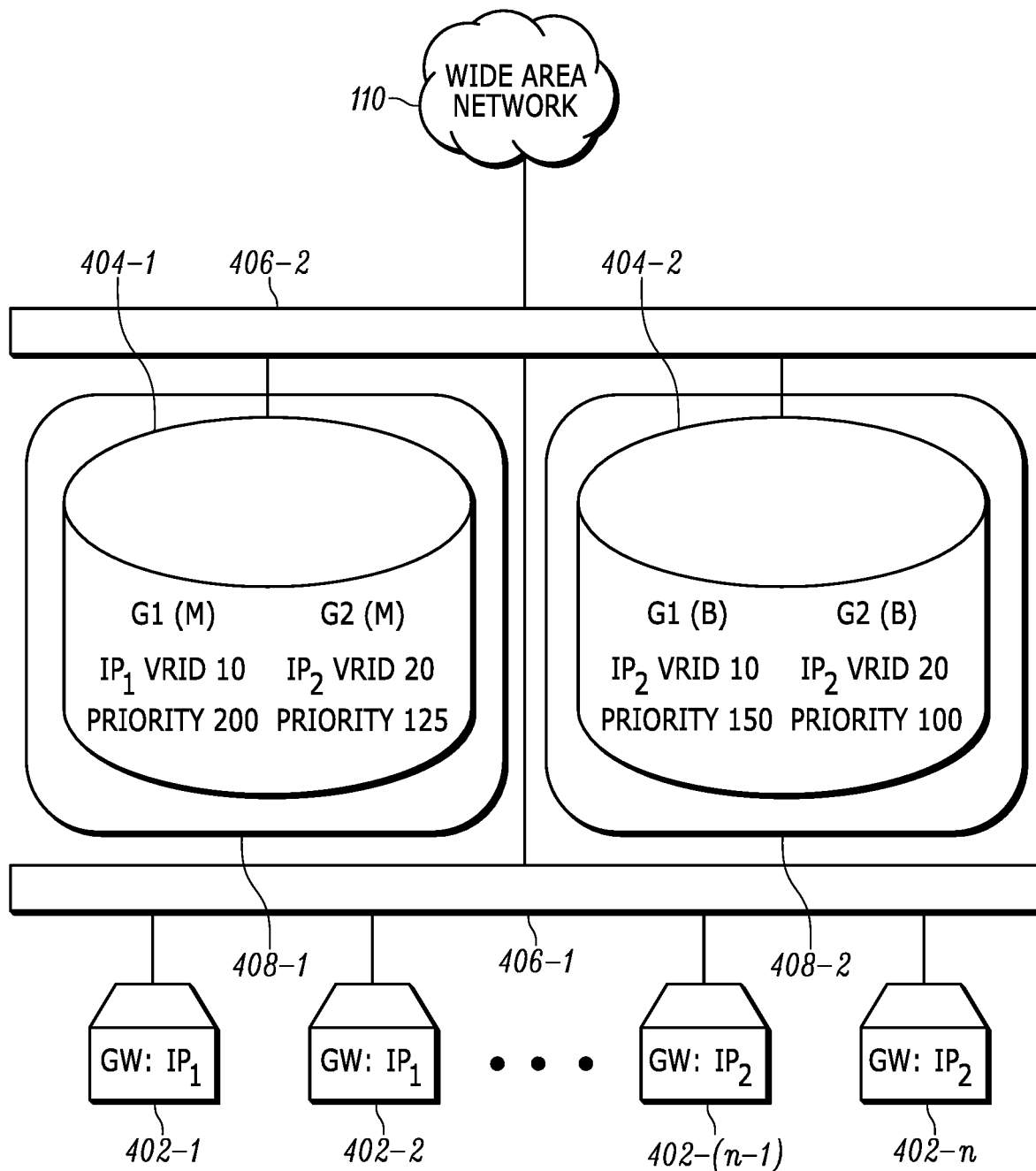
FIG. 4A is a diagram of the local virtual network of FIG. 2 further configured for load balancing in accordance with an embodiment of the invention.

FIG. 4A is a diagram of the local virtual network of FIG. 2 further configured for balancing network load. Again, the local virtual network includes two virtual routers 404-1, 404-2 managed by a first hypervisor 406-2 and several hosts 402-1-402-$n$ managed by a second hypervisor 406-1. In an embodiment, the virtual routers can be instantiated on two different physical routers 408-1, 408-2 and the hosts can be assigned to one of the two groups. Initially, traffic from each group is configured to flow through whichever virtual router currently is assigned the highest priority value for the group. As defined by VRRP, a maximum priority value is 255. In an embodiment, virtual routers can be assigned a high priority value, a low priority value, a high backup priority value, or a low backup priority value. High priority values are, for example, 200 or higher. High backup priority values are, for example, 150 or higher. Low priority values are, for example, 125 or lower. Low backup priority values are, for example, 100 or lower. Generally, high priority values are high values relative to all other values and high backup priority values are high values relative to all other values except high priority values. Similarly, low priority values low values relative to all other values except low backup priority values and low backup priority values are low values relative to all other values.

With reference to FIG. 4A, virtual router 404-1 has been assigned a high priority value (e.g., 200) for group 1 (G1) and virtual router 404-2 has been assigned a high backup priority value of 150 for group 1. Virtual router 404-1 has been assigned a low priority of 125 for Group 2 (G2) and virtual router 404-2 has been assigned a low backup priority value of 100 for group 2. For both group 1 and group 2, virtual router 404-1 has been assigned the highest priority value for the group. Thus, traffic from both groups will be configured to flow through virtual router 404-1 making virtual router 404-1 the master virtual router for both groups. If the master virtual router becomes unavailable, traffic will be automatically redirected to a backup router (e.g. virtual router 404-2) as described above.

In an embodiment, traffic from a group is configured to flow through a virtual router designated by a default gateway address. Hosts can be assigned to a group by configuring the host with a default gateway addresses corresponding to the group. To assign hosts to different groups, the hosts can be configured with different default gateway address. When traffic from both groups is configured to flow through a single virtual router, then the single virtual router is configured to be associated with the default gateway addresses for both groups. When traffic for the groups is configured to flow through different virtual routers, then the default gateway addresses corresponding to the groups are evenly associated with one of the two or more virtual routers to balance network load.

Figure 4B:
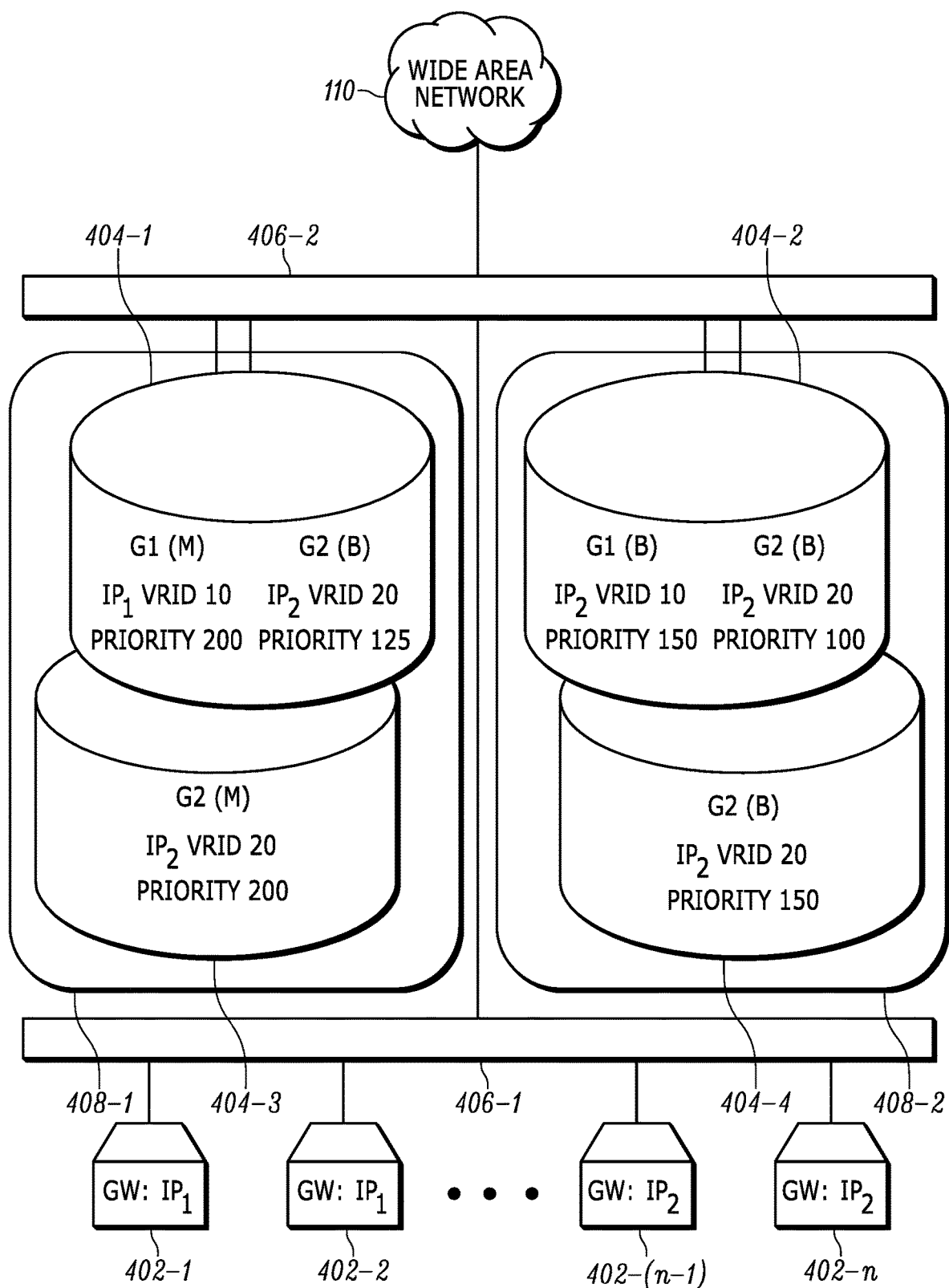
FIG. 4B is a diagram of the local virtual network of FIG. 4A in which two additional virtual routers have been initialized.

As network load grows, additional virtual routers can be initialized to balance the network load. FIG. 4B is a diagram of the local virtual network of FIG. 4 in which two additional virtual routers have been initialized. As illustrated, additional virtual router 404-3 has been initialized on physical router 408-1 and additional virtual router 404-4 has been initialized on physical router 408-2. As illustrated, virtual router 404-3 has been assigned a priority value of 200 for group 2, which is higher than the priority value assigned to any other virtual router for group 2. Accordingly, virtual router 404-3 becomes the master router for traffic from group 2, as described above with regards to master election, and traffic for group 2 will be routed to virtual router 404-3.

Virtual router 404-4 becomes a backup virtual router and traffic from group 2 will be routed to virtual router 404-4 before virtual router 404-2 or 404-1 should virtual router 404-3 become unavailable.

In an embodiment, when a new virtual router with a higher priority for a group is initialized (e.g., virtual router 404-3), the default gateway address for the group is re-associated with the new virtual router and traffic from the group is routed to the new virtual router. Thus, traffic can be routed to the new virtual router to balance network load without having to change the configuration of hosts in the network.

Priority Value

Figure 5:
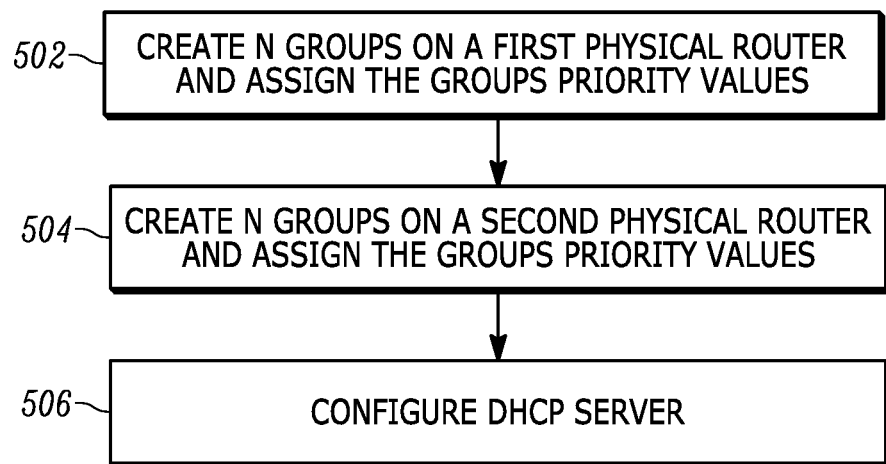
FIG. 5 is a flowchart diagram of a technique for assigning priority values in accordance with an embodiment of the invention.

In an embodiment, during the initialization of a virtual network in a virtual environment, virtual routers can be assigned priority values. FIG. 5 is a flowchart diagram of a technique for assigning priority values in accordance with an embodiment of the invention.

At block 502, n many groups are created on a first physical router and assigned priority values, where n is a number of virtual routers that could be needed based on an expected maximum load given a set of hosts for which traffic will be routed. In an embodiment, the priority value assigned to the first group is a high priority value (e.g., 200), while the priority value assigned to all other groups is a low priority value (e.g., 125). In an embodiment, as additional virtual routers are initialized, a high priority value can be assigned to a group (other than the first group) within the additional virtual routers. For example, virtual router 404-3, as described with reference to FIG. 4, can be initialized with a priority value of 200 for group 2.

At block 504, n many groups are created on a second physical router and assigned priority values. In an embodiment, the priority value assigned to the first group is a backup high priority value (e.g., 150), while the priority value assigned to all other groups is a backup low priority value (e.g., 100). In an embodiment, as additional virtual routers are initialized, a backup high priority value of 150 can be assigned to a group (other than the first group) within the additional virtual routers. For example, virtual router 404-4, as described with reference to FIG. 4, can be initialized with a backup high priority value of 150 for group 2.

At block 508, a Dynamic Host Configuration Protocol (DHCP) server is configured to give default gateway addresses to hosts based on the group of the host. For example, hosts in group 1 are given a first default gateway address, while hosts in group 2 are given a second default gateway address.

Figure 6A:
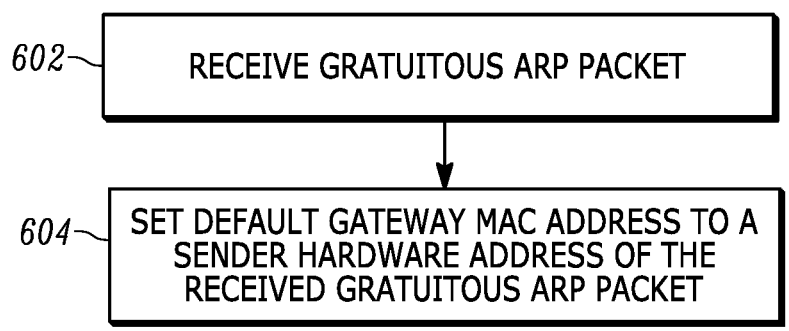
FIGS. 6A and 6B are flow chart diagrams of a method for providing automatic router assignment in a virtual environment as performed by a host and a virtual router, in accordance with an embodiment of the invention.
Figure 6B:
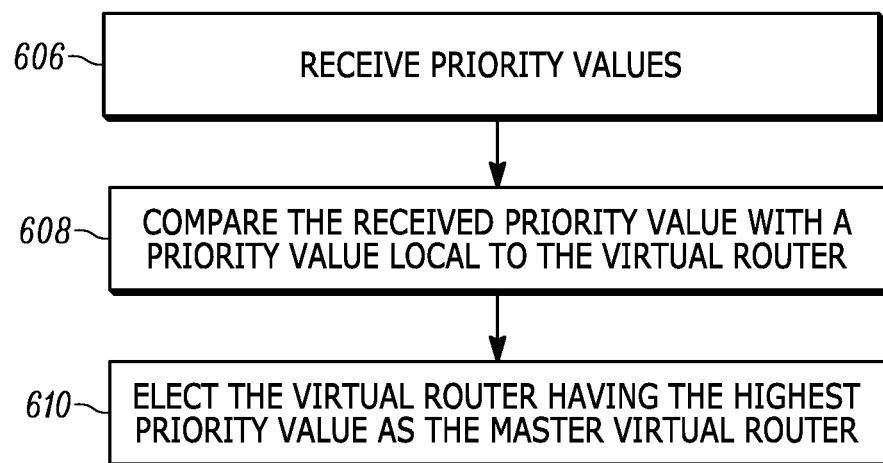

FIGS. 6A and 6B are flow chart diagrams of a method for providing automatic router assignment in a virtual environment as performed by a host and a virtual router, in accordance with an embodiment of the invention.

FIG. 6A is a flow chart diagram of the steps performed by a host in the virtual environment. At block 602, a gratuitous ARP packet is received. In an embodiment, the gratuitous ARP packet includes a sender hardware address. At block 604, the host sets its default gateway MAC address to the sender hardware address of the received gratuitous ARP packet. In an embodiment, the sender hardware address is the MAC address of whichever virtual router is currently the master virtual router. The steps of receiving gratuitous ARP packets and setting the default gateway MAC address are periodically repeated.

FIG. 6B is a flow chart diagram of the steps performed by a virtual router in the virtual environment. At block 606, the virtual router receives priority values. In an embodiment, the received priority values are the priority values of other virtual routers advertised in the virtual environment. In an embodiment, a virtual router advertises its priority value to a plurality of other virtual routers in the virtual environment using, for example, unicast if the virtual router is the master virtual router, if a priority value of zero has been advertised, if a master virtual router is unavailable, or if no virtual router has been elected as the master virtual router. At block 608, the virtual router compares the received priority value with a priority value local to the virtual router and, at block 610, the virtual router having the highest priority value is elected as the master virtual router.

Figure 7:
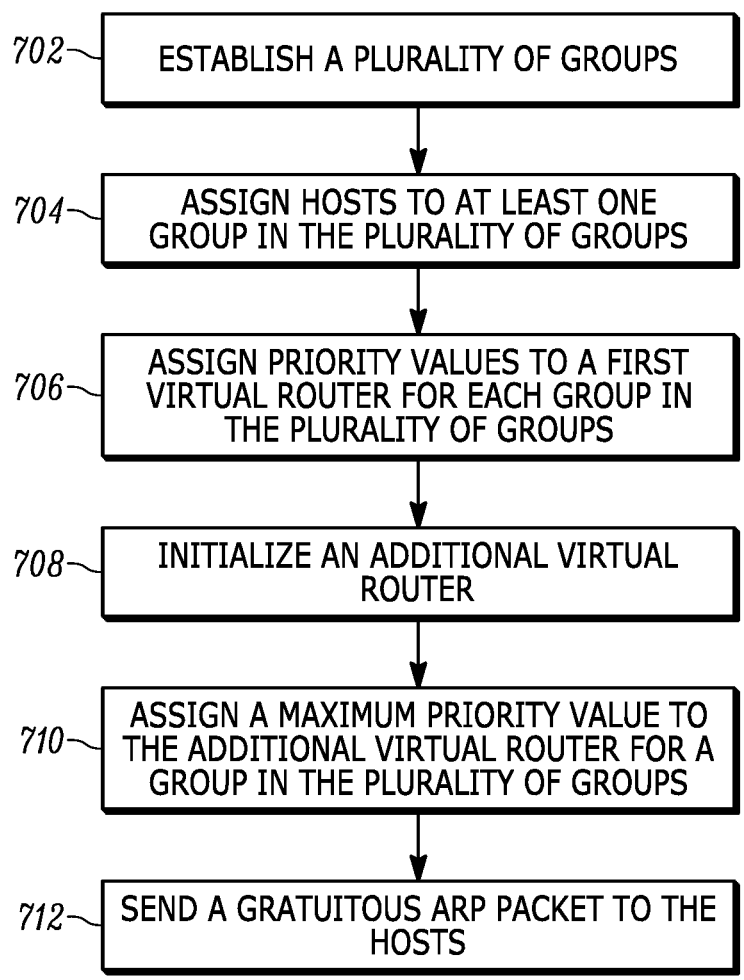
FIG. 7 is a flow chart diagram of the steps performed for automatically balancing network load in a virtual network

FIG. 7 is a flow chart diagram of the steps performed for automatically balancing network load in a virtual network. At block 702, a plurality of groups can be established. In an embodiment, the number of groups established can be determined based on the expected network load and the capabilities of a virtual router. For example, more groups may be needed if high network load is expected than if low network load is expected. At block 704, hosts are assigned to at least one of the groups in the plurality of groups. In an embodiment, a balanced number of hosts is assigned to each group. For example, in a virtual network with ten hosts and two groups, five hosts would be assigned to one group and five hosts would be assigned to the other group. At block 706, priority values are assigned to a first virtual router for each group in the plurality of groups. In an embodiment, the first virtual router is assigned a high priority value for a first group and assigned a low priority for all other groups in the plurality of groups. At block 708, an additional virtual router is initialized. In an embodiment, the first virtual router and the additional virtual router can be initialized on the same virtual machine. At block 710, the additional virtual router is assigned a high priority value for a group in the plurality of groups. In an embodiment, a priority value is assigned to the additional virtual router only for a single group. For example, if there are four groups, then the additional router will only be assigned a high priority for group 2. Thus, groups 1, 3, and 4 will route traffic through the first virtual router, while group 2 will route traffic through the additional virtual router. In another embodiment, a priority value can be assigned to the additional virtual router for multiple groups. For example, if there are four groups, then the additional virtual router can be assigned a high priority for groups 2 and 4. Thus, groups 1 and 3 will route traffic through the first virtual router, while groups 2 and 4 will route traffic through the additional virtual router. At block 712, the virtual router with the highest priority value for each group sends a gratuitous ARP packet to the hosts. In embodiment, the gratuitous ARP packet includes its MAC address and the default gateway corresponding to the group for which it has the highest priority. For example, if the first virtual router is assigned a high priority value for group 1 and the additional virtual router is assigned a high priority value for group 2, then the first virtual router sends a gratuitous ARP packet including its MAC address and the default gateway address corresponding to group 1 to all the hosts in the virtual network and the additional virtual router sends a gratuitous ARP packet including its MAC address and the default gateway address corresponding to group 2 to all the hosts in the virtual network. In an embodiment, determining which virtual router is assigned the highest priority value for a group involves performing the steps described with reference to FIG. 7B using the priority values assigned for the given group. In an embodiment, if four virtual routers are initialized, but only virtual router 1, 3, and 4 are assigned a priority for group 1, then virtual router 2 may be configured to ignore advertisements of assigned priority values for group 1.

Figure 8:
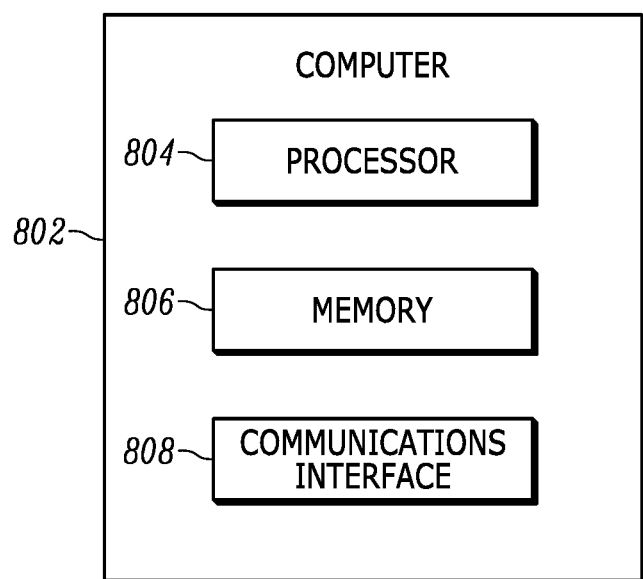
FIG. 8 is a block diagram of a computer.

FIG. 8 is a block diagram of a computer 800 that includes a processor 802, memory 804, and a communications interface 806. The processor may include a multifunction processor and/or an application-specific processor. Examples of processors include the PowerPC™ family of processors by IBM and the x86 family of processors by Intel. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for providing automatic virtual router assignment in a virtual environment managed by a hypervisor, the method comprising:
a plurality of virtual hosts and a plurality of virtual routers are configured to run on one or more virtual machines,
wherein the plurality of virtual routers comprises a master virtual router and at least one backup virtual router, each of the plurality of virtual routers has a MAC address assigned by the hypervisor, and wherein one of the plurality of virtual routers is elected as the master virtual router, and the master virtual router is a default gateway to receive traffic from the plurality of virtual hosts, and each virtual host includes a default gateway MAC address in an ARP cache;
receiving, by the plurality of virtual hosts, a gratuitous ARP packet from the master virtual router, wherein a sender hardware address of the received gratuitous ARP packet is the MAC address of the master virtual router;
setting the default gateway MAC address to the sender hardware address of the received gratuitous ARP packet in the ARP cache;
wherein each of the plurality of virtual routers receives an advertisement comprising a priority value,
wherein the at least one backup virtual router is configured to receive a priority value advertised by the master virtual router and to transition to a master virtual router state if the priority value advertised by the master virtual router is not greater than a priority value local to the at least one backup virtual router, and
wherein the master virtual router is configured to receive a priority value advertised by the at least one backup virtual router and to transition to a backup virtual router state if the priority value advertised by the at least one backup virtual router is greater than a priority value local to the master virtual router.

2. The method of claim 1 further comprising, if a virtual router is in the master virtual router state, advertising the priority value local of the virtual router to other virtual routers in the plurality of virtual routers.

3. The method of claim 1, wherein the advertisement is received in a control packet on a predetermined time interval.

4. The method of claim 1, wherein the method is repeated each time the master virtual router sends a new gratuitous ARP packet.

5. The method of claim 1, wherein the master virtual router is configured to send a new gratuitous ARP packet periodically.

6. The method of claim 1, wherein a plurality of priority values advertised by the plurality of virtual routers are advertised in control packets that further includes the MAC address of the virtual router advertising the priority value.

7. A system for providing automatic virtual router assignment in a virtual environment managed by a hypervisor, the system comprising:
a plurality of virtual hosts and a plurality of virtual routers configured to run on one or more virtual machines,
wherein the plurality of virtual routers comprises a master virtual router and at least one backup virtual router, each of the plurality of virtual routers has a MAC address assigned by the hypervisor, and wherein one of the plurality of virtual routers is elected as the master virtual router, and the master virtual router is a default gateway to receive traffic from the plurality of virtual hosts, and each virtual host includes a default gateway MAC address in an ARP cache;

wherein each of the plurality of virtual hosts is configured to receive a gratuitous ARP packet from the master virtual router, wherein a sender hardware address of the received gratuitous ARP packet is the MAC address of the master virtual router;

wherein each of the plurality of virtual hosts is configured to set the default gateway MAC address to the sender hardware address of the received gratuitous ARP packet in the ARP cache;

wherein each of the plurality of virtual routers receives an advertisement comprising a priority value, wherein the at least one backup virtual router is configured to receive a priority value advertised by the master virtual router and to transition to a master virtual router state if the priority value advertised by the master virtual router is not greater than a priority value local to the at least one backup virtual router, and wherein the master virtual router is configured to receive a priority value advertised by the at least one backup virtual router and to transition to a backup virtual router state if the priority value advertised by the at least one backup virtual router is greater than a priority value local to the master virtual router.

8. The system of claim 7, wherein the master virtual router is further configured to advertise the priority value local to the master virtual router to other virtual routers in the plurality of virtual routers.

9. The system of claim 7, wherein the advertisement is received in a control packet on a predetermined time interval.

10. The system of claim 7, wherein the master virtual router is configured to send a new gratuitous ARP packet periodically.

11. The system of claim 7, wherein the priority value advertised by another virtual router in the plurality of virtual routers is advertised in a control packet that further includes the MAC address of the virtual router advertising the priority value.

12. The system of claim 7, wherein a plurality of priority values advertised by the plurality of virtual routers are advertised in control packets that further includes the MAC address of the virtual router advertising the priority value.

13. A non-transitory computer-readable storage medium containing program instructions for providing automatic router assignment in a virtual environment managed by a hypervisor, wherein execution of the program instructions by one or more processors of a computer system causes the one or more processors to perform steps comprising:

a plurality of virtual hosts and a plurality of virtual routers are configured to run on one or more virtual machines, wherein the plurality of virtual routers comprises a master virtual router and at least one backup virtual router, each of the plurality of virtual routers has a MAC address assigned by the hypervisor, and wherein one of the plurality of virtual routers is elected as the master virtual router, and the master virtual router is a default gateway to receive traffic from the plurality of virtual hosts, and each virtual host includes a default gateway MAC address in an ARP cache;

receiving, by the plurality of virtual hosts, a gratuitous ARP packet from the master virtual router, wherein a sender hardware address of the received gratuitous ARP packet is the MAC address of the master virtual router;

setting the default gateway MAC address to the sender hardware address of the received gratuitous ARP packet in the ARP cache;

wherein each of the plurality of virtual routers receives an advertisement comprising a priority value, wherein the at least one backup virtual router is configured to receive a priority value advertised by the master virtual router and to transition to a master virtual router state if the priority value advertised by the master virtual router is not greater than a priority value local to the at least one backup virtual router, and wherein the master virtual router is configured to receive a priority value advertised by the at least one backup virtual router and to transition to a backup virtual router state if the priority value advertised by the at least one backup virtual router is greater than a priority value local to the master virtual router.

14. The non-transitory computer-readable storage medium of claim 13, wherein the steps further comprise, if a virtual router is in the master state, advertising the priority value local to the virtual router to other virtual routers in the plurality of virtual routers.

15. The non-transitory computer-readable storage medium of claim 13, wherein the advertisement is received in a control packet on a predetermined time interval.

16. The non-transitory computer-readable storage medium of claim 13, wherein the plurality of virtual hosts are configured to set the default gateway MAC address to the sender hardware address of the received gratuitous ARP packet in the ARP cache each time the master virtual router sends a new gratuitous ARP packet.

17. The non-transitory computer-readable storage medium of claim 16, wherein the master virtual router is configured to send the new gratuitous ARP packet periodically.

18. The non-transitory computer-readable storage medium of claim 13, wherein the priority value advertised by another virtual router in the plurality of virtual routers is advertised in a control packet that further includes the MAC address of the virtual router advertising the priority value.

19. The non-transitory computer-readable storage medium of claim 13, wherein a plurality of priority values advertised by the plurality of virtual routers are advertised in control packets that further includes the MAC address of the virtual router advertising the priority value.

* * * * *